(12) United States Patent
Ehrlich et al.

(10) Patent No.: US 9,495,169 B2
(45) Date of Patent: Nov. 15, 2016

(54) PREDICATE TRACE COMPRESSION

(75) Inventors: Robert N. Ehrlich, Round Rock, TX (US); Petru Lauric, Medford, MA (US); Robert A. McGowan, Cedar Park, TX (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 944 days.

(21) Appl. No.: 13/449,411

(22) Filed: Apr. 18, 2012

(65) Prior Publication Data

US 2013/0283020 A1    Oct. 24, 2013

(51) Int. Cl.
G06F 15/00 (2006.01)
G06F 7/38 (2006.01)
G06F 9/00 (2006.01)
G06F 9/44 (2006.01)
G06F 9/38 (2006.01)
G06F 9/30 (2006.01)

(52) U.S. Cl.
CPC ......... *G06F 9/3853* (2013.01); *G06F 9/30072* (2013.01)

(58) Field of Classification Search
None
See application file for complete search history.

(56) References Cited

U.S. PATENT DOCUMENTS

| | | | |
|---|---|---|---|
| 6,173,395 B1 | 1/2001 | Wisor et al. | |
| 6,247,146 B1 | 6/2001 | Wheatley et al. | |
| 7,308,681 B2 | 12/2007 | Ekanadham et al. | |
| 7,330,809 B2 | 2/2008 | Tabe | |
| 7,562,170 B2 | 7/2009 | Nardini et al. | |
| 7,596,725 B2 | 9/2009 | Agarwala | |
| 8,862,796 B1* | 10/2014 | Wogulis et al. | 710/57 |
| 2002/0016907 A1* | 2/2002 | Grochowski et al. | 712/226 |
| 2003/0135719 A1 | 7/2003 | DeWitt, Jr. et al. | |
| 2003/0192034 A1* | 10/2003 | Hayase | 717/128 |
| 2005/0183062 A1* | 8/2005 | Ubukata et al. | 717/104 |
| 2006/0294343 A1 | 12/2006 | Rejmaniak | |
| 2009/0037887 A1* | 2/2009 | Chavan | 717/128 |
| 2009/0287907 A1 | 11/2009 | Isherwood et al. | |
| 2010/0058079 A1* | 3/2010 | Yamamoto et al. | 713/300 |

* cited by examiner

Primary Examiner — George Giroux (57) ABSTRACT

A program trace data compression mechanism in which execution of a variable length execution set (VLES) including multiple non-branch conditional instructions are traced in real-time in a manner that allows the instruction execution to be reconstructed completely by correlating the trace data with the traced binary code.

19 Claims, 4 Drawing Sheets

PREDICATE TRACE COMPRESSION

FIELD OF THE DISCLOSURE

The present disclosure relates to data processing device, and more particularly to variable length execution set data processors.

BACKGROUND

The predicated execution of instructions by an instruction-based data processor is a processing technique used to conditionally execute a particular instruction based on the value of a Boolean source operand, referred to as a predicate. Variable Length Execution Set (VLES) architectures are instruction-based data processors that execute multiple instructions in parallel with each other, wherein the number of instructions in a VLES can vary. VLES architectures can be pipelined, wherein each VLES is executed in a plurality of sequential stages. One type of VLES architecture supports the predicated execution of instructions. External trace tools that are used to monitor the status of a program's flow need the predicate information in order to accurately resolve predicated instructions. During Debug, predicate tracing can be performed with a history buffer by adding a bit to the buffer for each predicate that could be updated in a VLES. For example, if the predicate was set, the reported bit in the buffer is one (1), and 0 if it was cleared, regardless of the previous value of the predicate. In response to several predicates being updated by a VLES, they can be reported according to a predicate index, from lower to higher.

BRIEF DESCRIPTION OF THE DRAWINGS

The present disclosure may be better understood, and its numerous features and advantages made apparent to those skilled in the art by referencing the accompanying diagrams.

DETAILED DESCRIPTION

According to a specific embodiment of the present disclosure, a predicate register that includes a plurality of predicates is written to a predicate history buffer in response to one of the predicates being updated for a second time, as will be better understood with reference to FIGS. 1 through 6 below.

Figure 1:
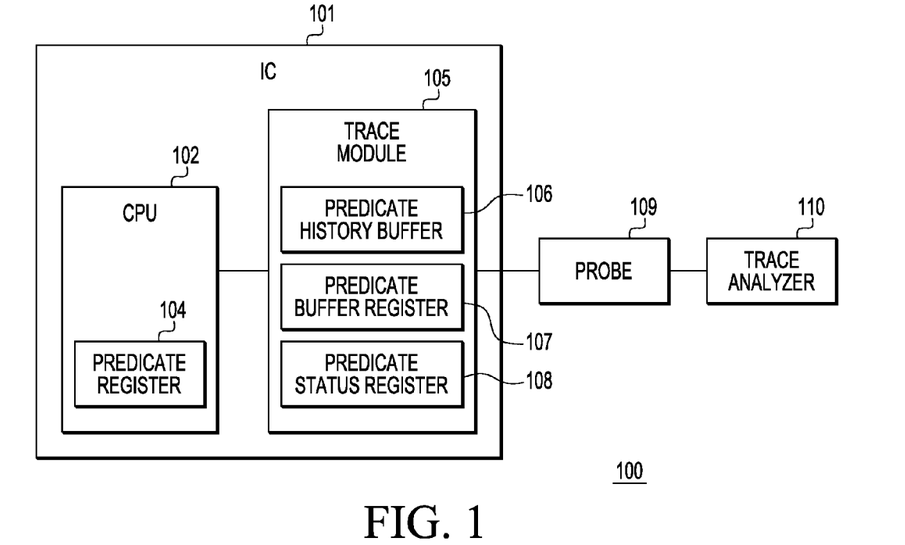
FIG. 1 illustrates a block diagram of a data processing system in a trace configuration.

FIG. 1 is a block diagram of a system 100 that includes an integrated circuit 101, a probe 109 and a trace analyzer 110. The integrated circuit 101 includes a CPU 102 and a trace module 105. CPU 102 includes a predicate register 104. Trace module 105 includes a predicate history buffer 106, a predicate buffer register 107, and a predicate status register 108.

The IC 101 can operate in either trace mode or non-trace mode, e.g., trace is enabled or disabled. During trace mode, the trace module 105 facilitates storing predicate state information from the predicate register 104 to the predicate history buffer 106, which, when full, will provide the predicate state information to a trace analyzer 110, such as an external debugger, via an interface probe 109. During full trace debugging, program trace data is being decoded to follow program flow, the trace analyzer 110 uses the historical predicate information stored at the predicate history buffer 106 to reconstruct state information for the IC 101 on a cycle-by-cycle (VLES) basis based upon available debug information that includes predicate information received from the predict predicate history buffer 106, and binary code disassembly information, or other higher-level code. The CPU 101 is considered to be in a debug mode of operation for purposes of discussion herein.

During operation, variable Length Instruction Sets (VLESs) are fetched from memory (not shown) and executed by CPU 102. As described herein, each instruction of a particular VLES can be a predicated destination instruction, a predicated source instruction, or a non-predicated instruction. The term "predicated source instruction" as used herein is intended to refer to an instruction that when executed determines the Boolean state of one or more predicates. The execution of a predicated source instruction results in the predicate register 104 being updated based upon the determined Boolean states. Note that determining and storing of the predicate state that results due to the execution of a predicated source instruction is implemented as an inherent feature of the CPU 102 executing the predicated source instruction, and not the result of other instructions fetched and executed by the CPU 102. Similarly, controlling operation of a predicated destination instruction is implemented as an inherent feature of the CPU and not by execution of other fetched instructions.

For purposes of discussion, an example of a predicated source instruction is represented by the mnemonic SUBP. During execution of the instruction SUBP, the CPU 102 determines a resultant by subtracting one value from another and updates the predicate register 104 based on the resultant. For example, when the resultant is zero a predicate referred to herein as a z-predicate is determined to be true, and a specific location of the predicate register 104 corresponding to the z-predicate is updated to a one. Conversely, when the resultant is non-zero the z-predicate is determined to be false and the specific location of the predicate register 104 is updated to a zero. Note that the predicate register 104 is said to be updated in response to execution of the SUBP instruction regardless as to the previous state of the z-predicate. Thus, for example, the predicate register 104 is considered updated by virtue of the instruction SUBP generating a non-zero value, which corresponds to a false z-predicate, even if the previous value of the z-predicate was already false, which is represented as a zero in the predicate register 104. Therefore, the state of the predicate register 104 does not need to change in order to be updated. For example, in response to the instruction SUBP generating a non-zero value, a write to store a zero (0) will be executed to store a zero at the z-predicate, even if the z-predicate already stored a zero (0).

The term "predicated destination instruction" as used herein is intended to refer to an instruction that executes conditionally based upon the state of one or more predicates stored at the predicate register 104. For purposes of discussion, an example of a predicated destination instruction is a branch instruction represented by the mnemonic BRA.Z.

During execution of the instruction BRA.Z, the CPU 102 will branch to an indicated address in response to the z-predicate stored at predicate register 104 being true. Otherwise, in response to the z-predicate stored at predicate register 104 being false, the CPU 102 will continue program flow with the instruction following the executed BRA.Z instruction. Note that for purposes of discussion, it is presumed that a particular instruction cannot be both a predicated source instruction and a predicated destination instruction, though in an alternate embodiment an instruction could be both, such as a predicated source/destination instruction that updates a first predicate based upon the state of a second predicate. It is further presumed for purposes of discussion that a VLES can have at most one predicated source instruction that updates a particular predicate. For example, a particular VLES cannot have two instances of the SUBP instruction, as that would result in two instructions updating the z-predicate. In an alternate embodiment a VLES could include multiple predicated source instruction associated with a particular predicate, wherein the predicate value is the logic OR of the predicate for each instruction.

Figure 2:
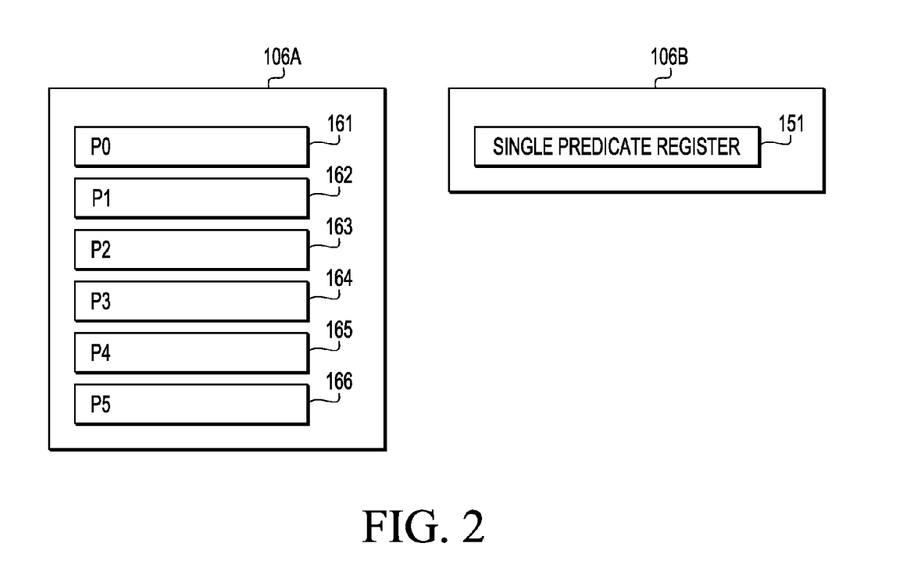
FIG. 2 illustrates specific embodiments of the predicate register of FIG. 1.

Information from predicate register 104 is periodically stored at the predicate history buffer 106 in order to maintain a historical record of the state of the predicate register 104. In one embodiment, assuming a plurality of predicates, the predicate history buffer 106 includes a corresponding plurality of individual predicate history buffers as illustrated in FIG. 2. FIG. 2 illustrates a particular embodiment 106A of a predicate history buffer 106 having six individual predicate history buffers 161 through 166. Each one of the six individual predicate history buffers 161 through 166 store information from a corresponding one of six predicates (P0-P5) represented in the predicate register 104. For example, assuming that predicate P0 is a z-predicate, the state of predicate P0 would be added to the individual predicate register 161 either periodically, such as every VLES cycle, or aperiodically, such as when a predicate changes.

In an alternate embodiment, the predicate history buffer 106B includes a single predicate history buffer to which all predicates are periodically stored. For example, each of the predicates P0-P6 of the predicate register will have their information stored at a single predicate history buffer 106.

Figure 3:
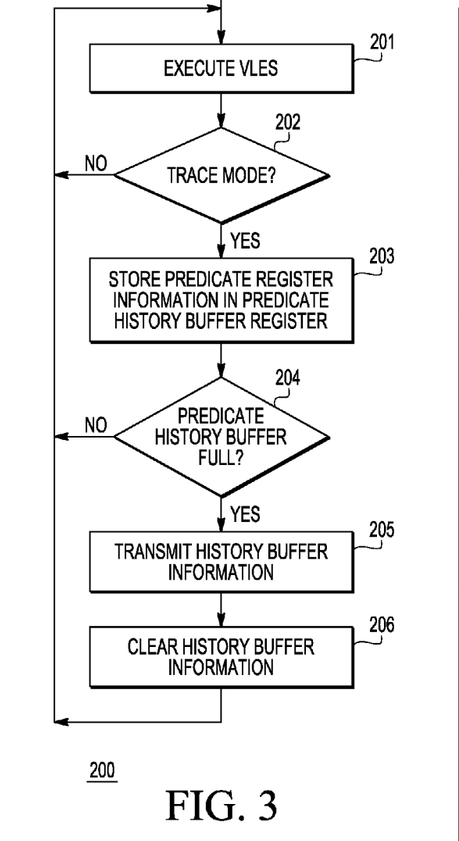
FIG. 3 illustrates a flow diagram of a method in accordance with a specific embodiment of the present disclosure.

FIG. 3 illustrates a flow diagram in accordance with specific embodiment to the present disclosure that provides information from the predicate register 104 to the predicate history buffer 106 in response to the execution of each VLES. For ease of discussion, the flow of FIG. 3 is described with respect to system 100 of FIG. 1. Note that neither the predicate buffer register 107 nor the predicate status register 108 are utilized in the embodiment of FIG. 3.

At block 201, a VLES is executed. If the VLES executes a predicated source instruction the predicate register 104 will be updated to reflect the proper state of the updated predicate. At block 202, it is determined whether or not the integrated circuit 101 is operating in a trace mode of operation. If so, flow proceeds to block 203, otherwise, flow returns to block 201.

At block 203, the state of the predicate is stored in the predicate history buffer 106. In accordance with an embodiment to the present disclosure where predicate history buffer 106 includes individual predicate history buffers 161 through 166, one bit will be added to each one of the individual history buffers 161 through 166 for each instruction cycle to indicate the predicate's current state. Alternatively, if predicate history buffer 106 is a single buffer, six bits, one for each predicate, will be stored at the predicate history buffer 106. Thus, if VLES0 updated predicates P2 and P5, to true (1) and false (0), respectively, the six bits "xx1xx0" would be stored at the predicate history buffer 106, where x represents bit values that were not updated.

At block 204, it is determined whether or not the predicate history buffer 106 is full. If not, flow proceeds at block 201, otherwise, flow proceeds to block 205. At block 205, the contents of the predicate history buffer 106 are transmitted by the trace module 105 to an external interface, e.g., an external data port, of the IC 101 that is connected to the probe 109 for delivery to trace analyzer 110. Once the contents of the predicate history buffer 106 have been transmitted from the predicate history buffer 106, the contents of predicate history buffer 106 are cleared at block 206 to allow for further predicate information to be stored.

Figure 4:
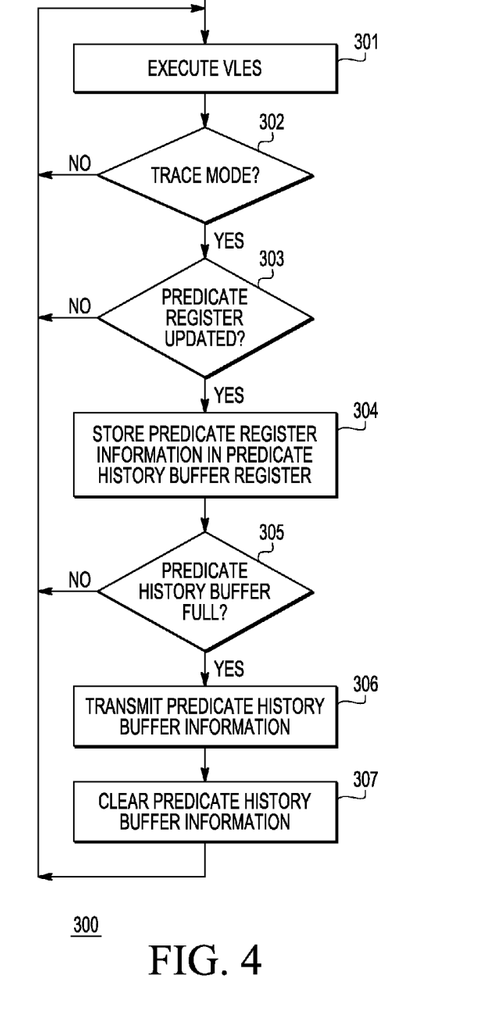
FIG. 4 illustrates a flow diagram of a method in accordance with a specific embodiment of the present disclosure.

FIG. 4 illustrates a flow diagram 400 in accordance with an alternate embodiment to the present disclosure that only provides information from the predicate register 104 to the predicate history buffer 106 in response to the predicate register 104 being updated. Note that neither the predicate buffer register 107 nor the predicate status register 108 are utilized in the embodiment of FIG. 3.

At block 301, a VLES is executed. If the VLES executes a predicated source instruction the predicate register 104 will be updated to reflect the proper state of the updated predicate. At block 302, it is determined whether or not the integrated circuit 101 is operating in a trace mode of operation. If so, flow proceeds to block 303, otherwise, flow returns to block 301.

At block 303, it is determined whether or not the predicate 104 has been updated in response to execution of the VLES at block 301. For example, the trace module 105 can be notified by the CPU 101 that an update of predicate 104 has occurred. Flow proceeds back to block 301 in response to no update occurring with respect to a particular VLES; otherwise, flow proceeds to block 304.

At block 304, the state of the predicate 104 is stored in the predicate history buffer 106. In accordance with one embodiment of the present disclosure, the trace module 105 will store the contents of the predicate register 104 in the predicate history buffer 106 in an uncompressed form. For example, if predicate history buffer 106 includes individual predicate history buffers 161 through 166, one bit will be added to each one of the individual history buffers 161 through 166 indicating the predicate's current state. Alternatively, if predicate history buffer 106 is a single buffer, six bits, one bit for each predicate, can be stored at the predicate history buffer 106. Thus, if VLES0 updated predicates P2 and P5, to true (1) and false (0), respectively, the six bits "xx1xx0" would be stored at the predicate history buffer 106, where x represents a bit having the previous, un-updated, state.

In accordance with another embodiment of the present disclosure, the trace module 105 will store the contents of the predicate register 104 in the predicate history buffer 106 in a compressed form. For example, if predicate history buffer 106 includes individual predicate history buffers 161 through 166, a bit will be added to a predicate's corresponding individual predicate history buffer only if that predicate was updated by the current VLES. Since the trace analyzer 110 has access to the binary code being executed, it will have visibility as to which VLES instruction updates which predicates, and will therefore be able to deterministically align bits stored in an individual predicate history buffer with an instruction cycle to which it belongs. Alternatively, if predicate history buffer 106 includes a single predicate history buffer, a bit will be added to the predicate history buffer 106 for each updated predicate. By adding the changed predicates in a defined order, such as from the lowest predicate (P0) to the highest numbered predicate (P5), the analyzer will be able to deterministically assign bits of the predicate buffer to particular predicates and VLES cycles. Thus, if VLES0 updated predicates P2 and P5, to true (1) and false (0), respectively, only the bits "10" would be stored at the predicate history buffer 106.

Next, at block 305, it is determined whether or not the predicate history buffer 106 is full. If not, e.g., the history buffer can hold more predicate information, and flow proceeds back to block 301, otherwise, the flow proceeds to block 306. At block 306, in response to being full, the predicate history buffer contents are transmitted by the trace module 105 to the probe 109. Once the contents of the predicate history buffer 106 have been transmitted, the contents of predicate history buffer 106 are cleared at block 307 to allow for further predicate information to be stored, and flow proceeds back to block 301.

Figure 5:
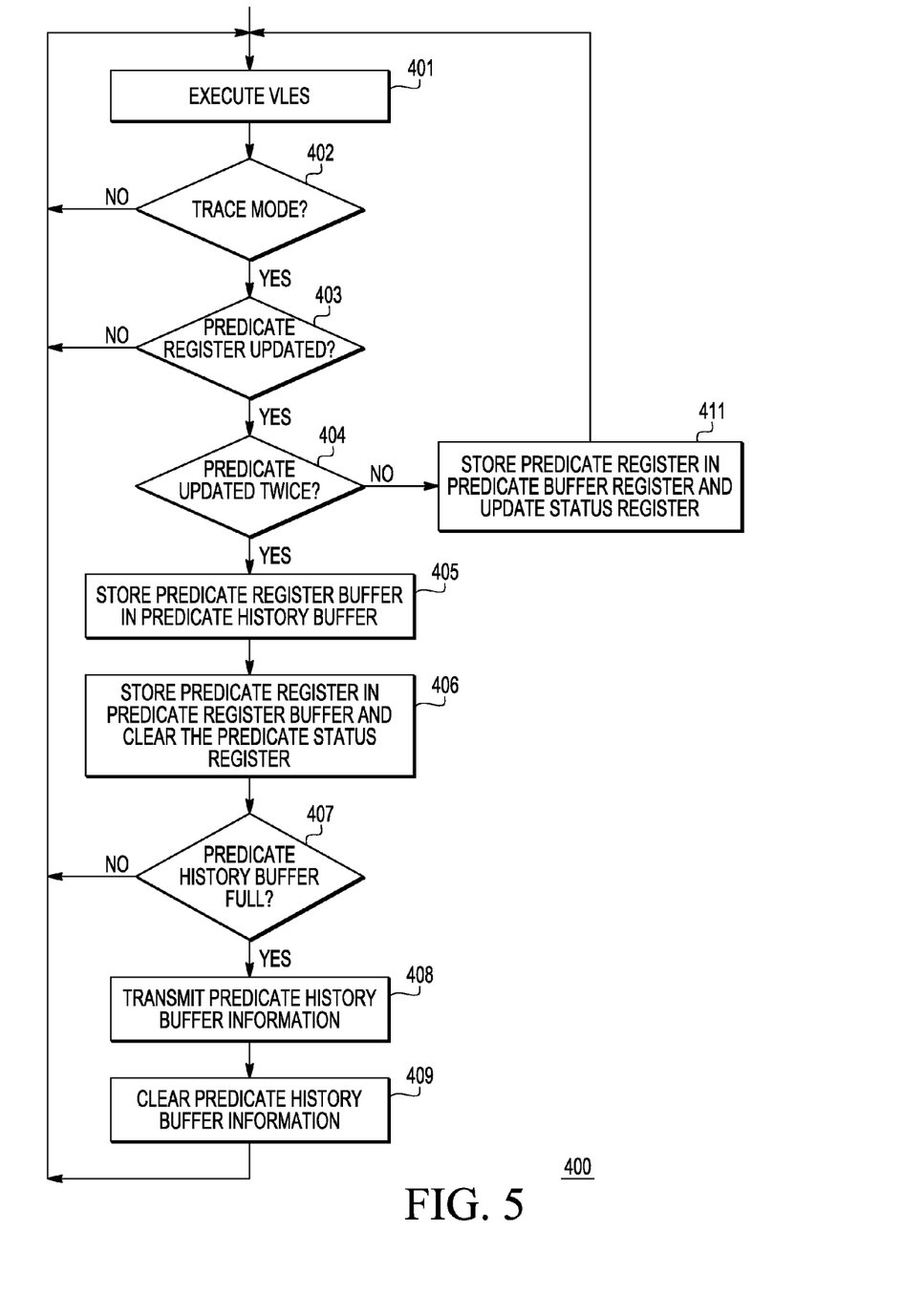
FIG. 5 illustrates a flow diagram of a method in accordance with a specific embodiment of the present disclosure.

FIG. 5 represents a flow diagram in accordance with the specific embodiment to the present disclosure that only updates the predicate history buffer 106 when execution of a VLES is determined to update a particular predicate a second time relative to a current set of unreported VLESs, as described in greater detail below. By only updating the predicate history buffer in response to a predicate being updated twice, the amount of information stored at the predicate history buffer 106 is reduced, which in turn reduces the amount of data transmitted to the probe 109. Note that both the predicate buffer register 107 and the predicate status register 108 of FIG. 1 are used in the embodiment of FIG. 5. Also note that particular applications of the flow diagram of FIG. 5 will be further described with reference to FIG. 6.

At block 401, a VLES is executed in a manner as described previously, and flow proceeds from block 401 to block 402, where it is determined whether or not the integrated circuit 101 is in a trace mode of operation. Flow proceeds back to block 401 if not in trace mode; otherwise, flow proceeds to block 403. At block 403, it is determined whether or not the currently executed VLES has resulted in an update of predicate register 104. If not, flow returns to block 401, otherwise, flow proceeds to block 404.

At block 404, it is determined whether or not a predicate updated by the currently executed VLES has been previously updated by a VLES of a set of unreported VLESs. As used herein, a set of unreported VLESs includes those VLESs having a predicated source instruction that updated a predicate in a manner that is reflected in the current predicate register 104, but that has not yet been stored at the predicate history buffer 106. In other words, it is determined whether execution of the current VLES resulted in at least one predicate in the predicate 104 being updated twice without being stored at the predicate history buffer 106. In one embodiment, an update status of each particular predicate of the predicate 104 is stored at the predicate status register 108 that is used during the evaluation of block 404 to determine if a current update is a second update. Thus if a predicate updated by the current VLES has an update status indicator of true at predicate status register 108 it is determined at block 404 that a predicate of the predicate register 104 has been updated for a second time.

At block 411, in response to no predicate being updated twice, the predicate status register 108 is updated to indicate those predicates updated by the current VLES and to store the current contents of the predicate register in the predicate buffer register 107 before flow returns to block 401. Thus, the updated status register can indicate predicates updated by the current VLES and predicates set by one or more previous VLES.

If at block 404 it was determined that a predicate of the predicate buffer had been updated previously, flow proceeds to block 405. At block 405, the contents of the predicate buffer register 107 are stored into the predicate history buffer 106 in one of the manners described with reference to block 304 of FIG. 4. Note that at block 405, the contents of the predicate buffer register 107 have not been updated to represent the current contents of the predicate register 104, but instead the predicate buffer register 107 stores the previous contents of the predicate register 104 that were the result of execution of the previous VLES. Flow proceeds to block 406 from block 405. At block 406, the predicate status register 108 is cleared, and those bits corresponding to a predicate or predicates that were updated by execution of the current VLES at block 401 are set to a true state, e.g., predicates not updated by the current VLES cleared, while predicates updated by the current VLES are set. Note that, the predicate information of the current VLES has not yet been stored at the predicate history buffer 106, and therefore is considered unreported. In addition, at block 406 the value of the predicate register is stored in the predicate buffer register 107 and flow proceeds to block 407. At block 407 it is determined whether or not the predicate history buffer 106 is full. If so, flow proceeds to block 408, otherwise, flow proceeds to block 401. At block 408, the trace module 115 will transmit the predicate history buffer information to the trace analyzer 110. Flow proceeds from block 408 to block 409 where the predicate history buffer is cleared before flow proceeds to block 401.

Figure 6:
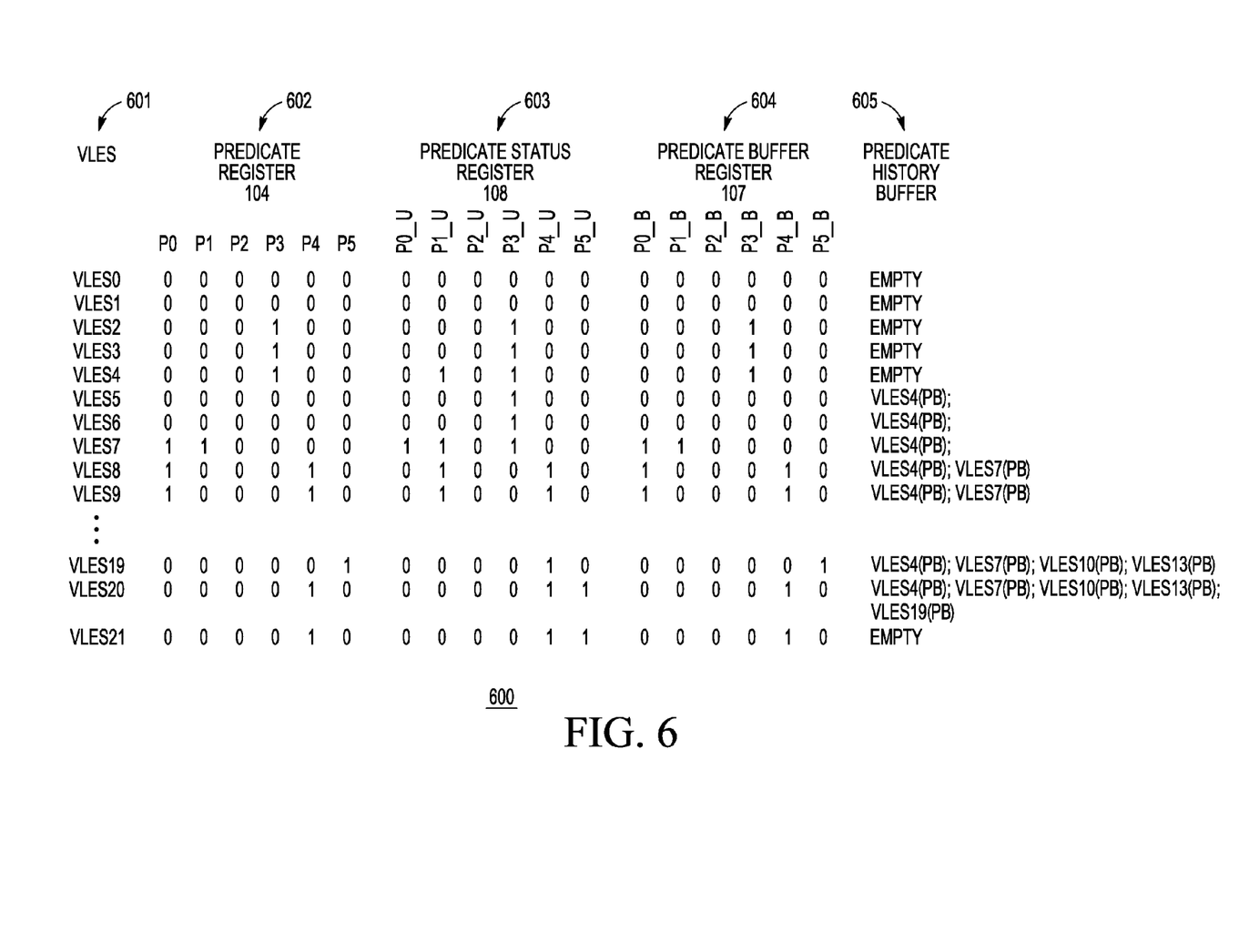
FIG. 6 illustrates in tabular form the state of portions of the data processing system of FIG. 1 for a sequence of executed VLESs.

The effects of the flow diagram of FIG. 5 will be further described with respect to a specific example represented by the table of FIG. 6. The table of FIG. 6 includes a plurality of rows, each of which correspond to the execution of a set of instructions for a particular VLES, labeled VLES0-VLES21 as indicated in column 601. Column 602 of the table of FIG. 6 indicates the state of the predicate register 104 responsive to the flow of FIG. 5, where each predicate has a value of zero (0) if it is in a false state, and a value of one (1) if it is in a true state. In the present example, it is presumed that the predicate register 104 has six-bits, each bit corresponding to a different predicate labeled P0-P6 in column 602. Column 603, labeled Predicate Status, indicates the contents of the predicate status register 108, responsive to the flow of FIG. 5, for the VLES indicated at column 601. The predicate status register 108 includes status bits, P0_U through P5_U, that correspond to predicates P0 through P5, respectively, where each status bit indicates whether its corresponding predicate has been updated by an unreported VLES as discussed above. The status bits at column 603 of table 600 have a value of 0 to indicate that its corresponding predicate has not been updated, and value of 1 to indicate that a status bit's corresponding predicate has been updated. Note, referring to FIG. 5, that the status bits are not updated, blocks 406 and 411, until after it is determined at block 404 whether a predicate has been updated twice. Column 605, labeled Predicate History Buffer, indicates the contents of the predicate history buffer 106, responsive to block 405 of FIG. 5. As discussed above, the information written to the predicate history buffer 106 can be compressed or uncompressed. Therefore, predicate register information stored at column 605 of table 600 is represented by the nomenclature VLES#(PB), where # indicates the numerical suffice of the previous VLES because the predicate information for the previous VLES is represented in the contents of the predicate buffer register 107 at the time it was reported, e.g., sent, to the predicate history buffer 106, whereas, the predicate register 104 information for the current VLES is not stored at predicate buffer register 107 at the time it was sent to the predicate history buffer 106.

Referring to specific entries of FIG. 6, the first entry corresponds to a VLES, referred to as VLES0, being processed by the IC 101. Note that during initialization of trace mode of IC 101, e.g., prior to entering the flow diagram of FIG. 5, the state of various registers of the IC 101 is communicated to the trace analyzer 110. For example, the state of each predicate stored in the predicate register 104 is sent to the trace analyzer 110 in response to entering trace mode. As illustrated herein at FIG. 6, the contents of the predicate register 104 are stored at predicate buffer register 107, and the predicate status buffer 108 has been cleared, e.g., set to zero (0), to indicate that none of the predicates at predicate register 104 have been updated by execution of a VLES.

In particular, with reference to the flow diagram of FIG. 5, at block 401 VLES0 is executed. VLES0 does not include any predicated source instructions; therefore, the predicate 104 is not updated. At block 402 it is determined that the IC 101 is in trace mode and flow proceeds to block 403. At block 403 it is determined that no predicate was updated by VLES0 and flow proceeds to block 401. The fact that no information in table 600 changed is indicative of a VLES executing that does not include a predicated source instruction. Therefore, as indicated at table 600, application of flow diagram 400 to VLES results in the following states: each predicate of the predicate register 104, predicates P0-P5, is false, e.g., zero (0), as indicated at column 602 of table 600; the update status bits P0_U through P5_U corresponding to the predicates P0-P5 are set to false in the predicate status register 108, e.g., a zero, as indicated at column 603, thereby indicating no predicates have been updated; the contents of the predicate register 104 have been stored at predicate buffer register 107; and the predicate history buffer being empty as indicated at 605.

Execution of VLES1 has no effect on the states of system 100 as indicated at table 600.

Execution of VLES2 has resulted in updates to the predicate register 104, the predicate status register 108, and to the predicate buffer register 107. With reference to flow diagram 400, at block 401 VLES2 is executed and predicate P3 is updated from a zero (0) to a one (1). Note that in this example updating predicate P3 to a one (1) resulted in a change of predicate P3's state. At block 402 it is determined that the IC 101 is in trace mode, and flow proceeds to block 403. At block 403 it is determined that the predicate register 104 was updated by VLES2, and flow proceeds from block 403 to block 404. At block 404, it is determined whether any one of the updated predicates, P3 in this example, is being updated for a second time since initialization. Since predicate P3's corresponding status bit, P3_U, in the predicate status register is zero (0), as indicated by the value of P3_U in the previous entry (VLES1), it is determined that prior to the current VLES being executed that the predicate P3 had not been updated and flow proceeds to block 411. At block 411, the status bit P3_U is changed from a zero (0) to a one (1) as indicated in column 603 of the current entry (VLES1) to indicate it was updated by the current VLES. Next, at block 411, the contents of the current predicate register 104 are stored to the predicate buffer register 107, before flow returns to block 401.

Execution of VLES3 has no effect on the states of system 100 represented in FIG. 6.

The next entry of table 600 is associated with VLES4, which includes a predicated destination instruction that updates predicate P1 to a false state (0). Note that the updated value of predicate P1 by VLES4 is illustrative of an update that does not result in a change of state for predicate P1. With reference to method 400, at block 401 VLES4 is executed and predicate P1 is updated to a zero (0) based on a predicated destination instruction. At block 402 it is determined that the IC 101 is in trace mode, and flow proceeds to block 403. At block 403 it is determined that one of the instructions of VLES4 resulted in the predicate P1 being updated. As a result, flow proceeds from block 403 to block 404. At block 404, it is determined whether any one of the predicates updated by the current VLES, P1 in this example, was previously updated by the set of unreported VLESs. Since predicate P1's corresponding status bit, P1_U, in the predicate status register is zero (0), as indicated by the value of P1_U in the previous entry (VLES3), it is determined that prior to the current VLES being executed that the predicate P1 had not been updated and flow proceeds to block 411. At block 411, the status bit P1_U is changed from a zero (0) to a one (1) in update predicate status register 108, as indicated in column 603 of the current entry (VLES4). Next, at block 411, the current contents of the predicate register 104 are stored to the predicate buffer register 107, before flow returns to block 401.

The next entry of table 600 is associated with VLES5, which includes a predicated destination instruction that updates predicate P3 to a false state (O). With reference to method 400, at block 401 VLES 5 is executed and predicate P3 is updated to a zero (0) based on a predicated destination instruction. At block 402 it is determined that the IC 101 is operating in trace mode and flow proceeds to block 403. At block 403, it is determined that one of the instructions of VLES5 resulted in the predicate P3 being updated, and flow proceeds to block 404. At block 404, it is determined whether any one of the predicates updated by the current VLES, P3 in this example, was previously updated by the set of unreported VLESs. Since predicate P3's corresponding status bit, P3_U, in the predicate status register 108 is one (1), as indicated by the value of P3_U in the previous entry (VLES4), it is determined that the predicate P3 had been updated prior to the current VLES being executed, and flow proceeds to block 405. Note that P3 was updated by VLES2, and that VLES2 is an unreported VLES in that the contents of the predicate register 104 based on VLES2 have not been stored at the predicate history buffer 106. Next, at block 405, in response to P3 having been previously updated, the current value of the predicate buffer register 107 is stored in the predicate history buffer 106. As discussed previously, the contents of the predicate buffer register 107 can be stored at the predicate history buffer 106 with or without compression techniques. For purposes of illustration, the contents of the predicate buffer register 107 are represented in column 605 of table 600 by the label VLES4(PB) to indicate that the contents of the predicate buffer register 107, which report predicate information up to VLES4, have been written to the predicate history buffer 106. Therefore, the contents (VLES4(PB)) of the predicate buffer register 107 as stored to the predicate history buffer 106 represent the state of the predicate buffer after execution of the previous VLES, VLES4. Therefore, the only unreported VLES is the current VLES, VLES5, because its updates to the predicate register 104 have not yet been stored in the predicate history buffer 106. Therefore, the information VLES4(PB) is the same information as was stored at the predicate register after execution of VLES4. Flow proceeds from block 405 to block 406. At block 406, the contents of the predicate register 104 are stored at the predicate buffer register 107, and the predicate status register 108 is cleared with the exception of status bit P3_U, which is set to one (1) to indicate that it was updated by the current VLES, VLES5, which is unreported. Thus, as indicated at entry VLES5 of table 600, the only predicate shown as having been updated is predicate P3. Flow proceeds from block 406 to block 407 where it is determined whether the predicate history buffer 106 is full. In the present example, the predicate history buffer 106 is not full and flow returns to block 401.

The next entry of table 600 is associated with VLES6, which has no effect on the states indicated in table 600.

The next entry of table 600 is associated with VLES7, which includes one or more predicated destination instructions that updated predicates P0 and P1 to a true state (1). With reference to method 400, at block 401 VLES7 is executed and predicates P0 and P1 are updated from zeros (0) to ones (1) based on one or more a predicated destination instructions. At block 402 it is determined that the IC 101 is operating in trace mode and flow proceeds to block 403. At block 403, it is determined that one of the instructions of VLES5 resulted in the predicates P0 and P1 being updated, causing flow to proceed to block 404. At block 404, it is determined whether any one of the predicates updated by the current VLES, predicates P0 and P1 in this example, were previously updated by the current set of unreported VLESs. Since predicates P0 and P1 have corresponding status bits, P0_U and P1_U, in the predicate status register that are set to zero (0), as indicated by the values of P0_U and P1_U in the previous entry (VLES6), it is determined that prior to the current VLES being executed that the predicates P0 and P1 had not been updated and flow proceeds to block 411. At block 411, the status bits P0_U and P1_U are changed from a zero (0) to a one (1) in predicate status register 108, as indicated in column 603 of the current entry (VLES7), to indicate that they have been updated. Next, at block 411, the current contents of the predicate register 104 are stored to the predicate buffer register 107, before flow returns to block 401.

The next entry of table 600 is associated with VLES8, which includes one or more predicated destination instructions that update predicates P1 and P4 to a false state (0) and to a true state (1), respectively. With reference to method 400, at block 401 VLES8 is executed and predicates P1 and P4 are updated at predicate register 104 to a one (1) and to a zero (0), respectively, based on one or more a predicated destination instructions. At block 402 it is determined that the IC 101 is operating in trace mode and flow proceeds to block 403. At block 403, it is determined that one of the instructions of VLES8 resulted in the predicates P1 and P4 being updated, causing flow to proceed to block 404. At block 404, it is determined whether any one of the predicates updated by the current VLES, predicates P1 and P4 in this example, were previously updated by an unreported VLES. Since predicate P1's corresponding status bit, P1_U, in the predicate status register is set to one (1), as indicated by the value of P1_U in the previous entry (VLES7), it is determined that prior to the current VLES being executed that the predicate P1 had been updated and flow proceeds to block 405. At block 405, in response to P1 having been previously updated, the current value of the predicate buffer register 107, VLES7(PB) is stored in the predicate history buffer 106 and flow proceeds from block 405 to block 406. At block 406, the contents of the predicate register 104 are stored at the predicate buffer register 107, and the predicate status register 108 is cleared with the exception of status bits P1_U and P4_U, which are set to U to indicate that they were updated by the current VLES. Thus, as indicated at table 600, the only predicates shown as having been updated in the entry corresponding to VLES8 are predicates P1_U and P4_U. Flow proceeds from block 406 to block 407 where it is determined whether the predicate history buffer 106 is full. In the present example, the predicate history buffer 106 is not full and flow returns to block 401.

The next entry of table 600 is associated with VLES9, which has no effect on the states indicated in table 600.

IC 101 continues to process VLESs in the manner described until the predicate history buffer is full, which occurs with respect to the entry of FIG. 6 corresponding to VLES20.

The next to last entry of table 600 is associated with VLES20, which includes one or more predicated destination instructions that update predicates P4 and P5 to a true state and to a false state, respectively. With reference to method 400, at block 401 VLES20 is executed and predicates P4 and P5 are updated at predicate 104 to a one (1) and a zero (0), respectively, based upon VLES20 having one or more predicated destination instructions. At block 402 it is determined that the IC 101 is operating in trace mode and flow proceeds to block 403. At block 403, it is determined that one of the instructions of VLES20 resulted in the predicates P4 and P5 being updated, causing flow to proceed to block 404. At block 404, it is determined whether any one of the predicates updated by the current VLES, i.e., predicates P4 and P5 in VLES20, are indicated as being previously updated. Since predicate P4's corresponding status bit, P4_U in the predicate status register is set to one (1), as indicated by the value of P4_U in the previous entry (VLES 19), it is determined that prior to the current VLES being executed that the predicate P4 had been updated by an unreported VLES and flow proceeds to block 405. At block 405, in response to P4 having been previously updated, the current value of the predicate buffer register 107, VLES19 (PB), is stored in the predicate history buffer 106 and flow proceeds from block 405 to block 406. At block 406, the contents of the predicate register 104 are stored at the predicate buffer register 107, and the predicate status register 108 is cleared with the exception of status bits P4_U and P5_U, which are set to one (1) to indicate that they were updated by the current VLES. Flow proceeds from block 406 to block 407 where it is determined whether the predicate history buffer 106 is full. The predicate history buffer 106 is deemed to be full and flow proceeds to block 408. At block 408 the trace module 105 transmits the contents of the predicate history buffer 106 to the trace analyzer 110, via the probe 109. At block 409 the predicate history buffer 106 is cleared, and flow proceeds to block 401. Note that the content of the predicate history buffer in column 605 represents the content of the predicate history buffer prior to sending its contents to the probe 109 at block 408, and that after sending, the predicate history buffer 106 is empty, as indicated at VLES21, which has had no effect on the predicate register 104.

It will be appreciated that the predicate history buffer transmitted includes multiple sets of predicate register information when its contents are transmitted to the trace analyzer 110. Each set of predicate register information can indicate updates to multiple predicates that occurred as the result of executing multiple VLESs. For example, referring to the table of FIG. 6, it can be deduced that the predicate information VLES4(PB) includes predicate information that was updated by execution of VLES2, predicate P3, and by execution of VLES4, predicate P1. By only storing the predicate register's 104 state information at the predicate history buffer 106, in response to a predicate having been previously updated by an unreported VLES, the amount of data that needs to be transmitted is compressed. Note that the trace analyzer 110 has a copy of the source code executing at the IC 101, which, along with the information stored at the predicate history buffer, allows the updated state of each predicate to be reconstructed on a cycle-by-cycle (VLES) basis.

It will be further appreciated that various transport mechanisms can be used for getting trace data off of the IC 101. For example: provide trace data from the IC via a parallel port or a high speed serial trace port (HSSTP), to probe 109; collect trace information to a large on-chip trace buffer or even to DDR memory and connect a JTAG debug probe and read the data when the trace buffer is full, or Send the trace data via some other link (like Ethernet, or UART)

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   storing, in response to a data processor executing an instruction at a first time, a first set of predicate information to a predicate history buffer of the data processor, the first set of predicate information indicating a first state of a plurality of predicates stored at a predicate register in response to the data processor executing an instruction at a second time, the second time prior to the first time;
   updating a state of a first predicate of the plurality of predicates in response to executing an instruction at a third time; and
   storing a second set of predicate information to the predicate history buffer in response to determining the state of the first predicate was previously updated by an instruction executed between the second time and the third time, otherwise not storing the second set of predicate information to the predicate history buffer.

2. The method of claim 1, wherein the instruction executing at the first time is an instruction of a first Variable Length Execution Set (VLES), wherein executing the first VLES includes executing the first instruction.

3. The method of claim 1, wherein updating the state of the first predicate in response to executing the instruction at the third time results in a Boolean state of the first predicate remaining the same.

4. The method of claim 1, wherein updating the state of the first predicate in response to executing the instruction at the third time results in a change of a Boolean state of the first predicate.

5. The method of claim 1, wherein storing the second set of predicate information is further responsive to determining the processor is in a trace mode of operation.

6. The method of claim 5 further comprising, responsive to the processor being in the trace mode, transmitting the contents of the predicate history buffer, after storing the second set of predicate information to the history buffer to an external data port of the data processor based upon a fullness of the predicate history buffer.

7. The method of claim 5 further comprising, responsive to the processor being in the trace mode, transmitting the contents of the predicate history buffer, after storing the second set of predicate information to the history buffer to a trace analyzer via an external data port of the data processor based upon a fullness of the predicate history buffer.

8. The method of claim 1, wherein storing the first set of predicate information to the predicate history buffer includes storing the information from a single register.

9. The method of claim 1, wherein storing the second set of predicate information further comprises storing information related to predicates of the plurality of predicates, other than the first predicate, that have not been previously stored to the predicate history buffer.

10. A method of execution of variable length execution set (VLES) instructions, the method comprising:
    storing, at a first time, trace information to a predicate history buffer that reflects a state of a set of predicates that includes a first predicate;
    updating, at a second time, a state of the first predicate in response to a data processor executing a VLES instruction that includes a predicated source instruction, wherein, as of the second time, the last time that trace information reflecting the state of the first predicate was stored at the predicate history buffer was the first time; and
    storing trace information at the predicate history buffer to reflect the state of the set of predicates immediately prior to the second time if the state of the first predicate has been updated between the first time and the second time, otherwise, leaving the predicate history buffer unaltered if the state of the first predicate has not been updated between the first time and the second time, wherein the state of the set of predicates immediately prior to the second time has not been previously stored at the predicate history buffer.

11. The method of claim 10, providing contents of the predicate history buffer to a destination in response to determining the predicate history buffer is full.

12. The method of claim 10, wherein the state of the first predicate at the second time is a Boolean state that is the same as the state of the first predicate prior to the second time.

13. The method of claim 10, wherein the state of the first predicate at the second time is a Boolean state that is the opposite as the state of the first predicate prior to the second time.

14. The method of claim 10, wherein storing the predicate information is responsive to determining the processor is in a trace mode of operation.

15. A device comprising:
    a register comprising a plurality of locations that are to store the state of a set of predicates, each predicate of the set of predicates having a corresponding Boolean state;
    a processor unit to execute variable length execution instructions (VLESs), including predicated destination instructions whose operations are determined based upon the state of a predicate, the processor unit to also selectively update the Boolean states of predicates responsive to executing a predicated source instruction; and
    a trace module to monitor the register to determine whether a previously updated predicate that has not been reported to a predicate history buffer has been updated a second time by a current VLES, if the previously updated predicate that has not been reported to the predicate history buffer is being updated a second time by the current VLES, the state of the register prior to the previously updated predicate being updated the second time is reported to the predicate history buffer to report the state of the previously updated predicate, otherwise, if no previously updated predicate is being updated a second time, since being reported to the predicate history buffer, no state information of the register is reported to the predicate history buffer.

16. The device of claim 15, wherein the trace module is further to determine when the predicate history buffer is full and to transmit its contents to be analyzed by a trace analyzer in response to the predicate history buffer being full.

17. The device of claim 15 further comprising a storage location to maintain information that indicates which predicates of the set of predicates have been updated since being reported to the predicate history buffer.

18. The device of claim 15, wherein the processor unit is to update the Boolean states of the predicates by generating write access requests regardless the previous Boolean states of the predicates.

19. The device of claim 15 further comprising a debug register to store a debug indicator, and the trace module is to monitor the register in response to the register storing an enabled debug indicator.

* * * * *